United States Patent
Johnston et al.

(10) Patent No.: US 9,951,219 B2
(45) Date of Patent: Apr. 24, 2018

(54) BLEED RESISTANT, OIL-EXTENDED OLEFIN BLOCK COPOLYMER COMPOSITION WITH SURFACE-ACTIVE AGENT

(71) Applicant: Dow Global Technologies LLC, Midland, MI (US)

(72) Inventors: Robert T. Johnston, Lake Jackson, TX (US); Wenbin Liang, Pearland, TX (US); Ashish Batra, Zionsville, IN (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/660,139

(22) Filed: Jul. 26, 2017

(65) Prior Publication Data

US 2017/0321053 A1 Nov. 9, 2017

Related U.S. Application Data

(63) Continuation of application No. 14/651,827, filed as application No. PCT/US2013/077408 on Dec. 23, 2013.

(60) Provisional application No. 61/746,810, filed on Dec. 28, 2012.

(51) Int. Cl.
| | |
|---|---|
| *C08L 53/00* | (2006.01) |
| *C08K 5/095* | (2006.01) |
| *C08K 5/01* | (2006.01) |
| *C08L 91/00* | (2006.01) |
| *C08K 5/00* | (2006.01) |

(Continued)

(52) U.S. Cl.
CPC .............. *C08L 53/00* (2013.01); *C08K 5/0008* (2013.01); *C08K 5/01* (2013.01); *C08L 23/12* (2013.01); *C08L 91/00* (2013.01); *C08L 23/0815* (2013.01); *C08L 2205/02* (2013.01); *C08L 2207/04* (2013.01); *C08L 2207/322* (2013.01)

(58) Field of Classification Search
None
See application file for complete search history.

(56) References Cited

U.S. PATENT DOCUMENTS

| | | |
|---|---|---|
| 4,386,179 A | 5/1983 | Sterling |
| 6,187,837 B1 | 2/2001 | Pearce |
| 7,608,668 B2 | 10/2009 | Li Pi Shan et al. |

(Continued)

FOREIGN PATENT DOCUMENTS

| | | |
|---|---|---|
| JP | 2004-323552 A | 11/2004 |
| WO | 2011/062809 A1 | 5/2011 |

(Continued)

OTHER PUBLICATIONS

Machine translation of JP 2004-323552 A to Tasaka.

(Continued)

*Primary Examiner* — Vu A Nguyen
(74) *Attorney, Agent, or Firm* — Husch Blackwell LLP (57) ABSTRACT

The present disclosure provides an oil-extended olefin block copolymer composition. The oil-extended olefin block copolymer composition includes an olefin block copolymer, an oil, and a surface-active agent and may optionally include an olefin-based polymer. The oil-extended olefin block copolymer composition advantageously exhibits reduced, or no, oil-bleed.

13 Claims, 1 Drawing Sheet

20.1% gray scale 34.6% gray scale (51) Int. Cl.
*C08L 23/12* (2006.01)
*C08L 23/08* (2006.01)

(56) References Cited

U.S. PATENT DOCUMENTS

2005/0017396 A1* 1/2005 Pearce ................... A43B 13/04
                                                                                              264/148
2007/0112127 A1    5/2007  Soediono et al.
2011/0034577 A1*  2/2011  Peng ...................... C08J 9/0061
                                                                                              521/140

FOREIGN PATENT DOCUMENTS

| WO | 2012/091923 A1 | 7/2012 | |
| WO | 2012/091924 A1 | 7/2012 | |
| WO | WO 2012091923 A1 * | 7/2012 | .......... C08L 23/0807 |
| WO | 2013/101405 A2 | 7/2013 | |

OTHER PUBLICATIONS

Dobrynin, J. Chem. Phys, 107(21), p. 9234-9238, 1997.
Potemkin, Physical Review E, 57(6), pp. 6902-6912, 1998.
Williams et al., Polymer Letters, vol. 6, pp. 621-624, 1968.

\* cited by examiner

20.1% gray scale

34.6% gray scale

BLEED RESISTANT, OIL-EXTENDED OLEFIN BLOCK COPOLYMER COMPOSITION WITH SURFACE-ACTIVE AGENT

BACKGROUND

Olefin block copolymers (OBC) are useful for producing soft compounds such as soft touch articles. The block architecture of the OBC results in good tensile strength, compression set and temperature resistance. To make soft touch compositions (i.e., compositions with a low durometer value and/or a low Shore A hardness value), OBC is mixed with an oil. As the amount of oil is increased, so too increases the likelihood of oil-bleed. Oil-bleed is problematic because it produces undesirable haptics in articles fabricated from these compounds.

A need therefore exists for a soft, oil-extended OBC composition with reduced oil-bleed.

SUMMARY

The present disclosure is directed to oil-extended OBC compositions with reduced, or no, oil-bleed. The present compositions contain a surface-active agent that is an oil-bleed inhibitor. The presence of the surface-active agent maintains the softness of the composition, and simultaneously reduces, or eliminates, oil-bleed.

The present disclosure provides a composition. In an embodiment, the composition is an oil-extended olefin block copolymer composition and includes an olefin block copolymer, an oil, and a surface-active agent.

The present disclosure provides another composition. In an embodiment, the composition is an oil-extended olefin block copolymer composition and includes an olefin block copolymer, an olefin-based polymer, an oil, and a surface-active agent An advantage of the present disclosure is the provision of a soft, oil-extended OBC composition with reduced, or no, oil-bleed.

DETAILED DESCRIPTION

The present disclosure provides an oil-extended olefin block copolymer (OBC) composition. An "oil-extended OBC composition," as used herein, is an OBC composition that contains an (i) OBC and (ii) at least 25 wt % oil, based on the total weight of the composition. In an embodiment, the oil-extended OBC composition contains at least 30 wt %, or at least 40 wt % to 50 wt %, or 60 wt %, or 70 wt % oil. In an embodiment, an oil-extended olefin block copolymer composition is provided and includes an olefin block copolymer, an oil, and a surface-active agent.

1. OBC

The term "olefin block copolymer" or "OBC" is an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. In some embodiments, the multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The olefin block copolymer includes various amounts of "hard" and "soft" segments. "Hard" segments are blocks of polymerized units in which ethylene is present in an amount greater than about 95 weight percent, or greater than about 98 weight percent based on the weight of the polymer. In other words, the comonomer content (content of monomers other than ethylene) in the hard segments is less than about 5 weight percent, or less than about 2 weight percent based on the weight of the polymer. In some embodiments, the hard segments include all, or substantially all, units derived from ethylene. "Soft" segments are blocks of polymerized units in which the comonomer content (content of monomers other than ethylene) is greater than about 5 weight percent, or greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can be present in an OBC from about 1 weight percent to about 99 weight percent of the total weight of the OBC, or from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in U.S. patent application Ser. No. 11/376,835, entitled "Ethylene/α-Olefin Block Inter-polymers," filed on March 15, 2006, in the name of Colin L. P. Shan, Lonnie Hazlitt, et.

al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetric (DSC) or equivalent technique.

The term "multi-block copolymer" or "segmented copolymer" is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), region-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a PDI from about 1.7 to about 3.5, or from about 1.8 to about 3, or from about 1.8 to about 2.5, or from about 1.8 to about 2.2. When produced in a batch or semi-batch process, the OBC possesses PDI from about 1.0 to about 3.5, or from about 1.3 to about 3, or from about 1.4 to about 2.5, or from about 1.4 to about 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2, \text{ and/or}$$

where d is from 0.850 g/cc, or 0.860, or 0.866 g/cc, or 0.87 g/cc, or 0.880 g/cc to 0.89 g/cc, or 0.91 g/cc, or 0.925 g/cc, and Tm is from 113° C., or 115° C., or 117° C., or 118° C. to 120° C., or 121° C., or 125° C.; and/or (B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero}$$
$$\text{and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The olefin block copolymer may also have:

(F) a molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3. It is understood that the olefin block copolymer may have one, some, all, or any combination of properties (A)-(G).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5, 9-dimethyl-1,4, 8-decatriene;

and 3-phenylpropene, 4-phenylpropene, 1,2-difluoroethylene, tetrafluoroethylene, and 3,3,3-trifluoro-1-propene.

In an embodiment, the OBC has a density of less than or equal to about 0.90 g/cc, or less than about 0.89 g/cc. Such low density OBCs are generally characterized as amorphous, flexible and having good optical properties, e.g., high transmission of visible and UV-light and low haze.

In an embodiment, the olefin block copolymer has a density from 0.85 g/cc to 0.88 g/cc.

In an embodiment, the olefin block copolymer has a melt index (MI) from about 0.1 g/10 min to about 10 g/10, or from about 0.1 g/10 min to about 1.0 g/10 min, or from about 0.1 g/10 min to about 0.5 g/10 min as measured by ASTM D 1238 (190° C./2.16 kg).

The olefin block copolymer has a 2% secant modulus greater than zero and less than about 150, or less than about 140, or less than about 120, or less than about 100, MPa as measured by the procedure of ASTM D 882-02.

The present OBC has a melting point of less than about 125° C. The melting point is measured by the differential scanning calorimetry (DSC) method described in WO 2005/090427 (US2006/0199930), the entire content of which is incorporated by reference herein.

In an embodiment, the oil-extended OBC composition includes from 20 wt % to 60 wt % OBC, or from 20 wt %, or 30 wt % to 35 wt %, or 40 wt %, or 50 wt %, or 60 wt % OBC.

2. Oil

The oil-extended OBC composition includes an oil. The oil can be an aromatic oil, a mineral oil, a naphthenic oil, paraffinic oil, a triglyceride-based vegetable oil such as castor oil, a synthetic hydrocarbon oil such as polypropylene oil, a silicone oil, or any combination thereof. Nonlimiting examples of suitable oil include mineral oil sold under the trade names HYDROBRITE® 550 (Sonneborn), Kaydol (Sonneborn), Britol 50T (Sonneborn), Clarion 200 (Citgo), and Clarion 500 (Citgo).

In an embodiment, the oil-extended OBC composition contains at least 20 wt %, or at least 30 wt %, or at least 40 wt %, or at least 45 wt % to 55 wt %, or 70 wt % oil. Weight percent is based on the total weight of the oil-extended OBC composition.

3. Surface-active Agent

The oil-extended OBC composition includes a surface-active agent. The term "surface-active agent," as used herein, is a compound that reduces the surface energy of the composition by migrating to the surface of the composition, the surface-active agent having a lower surface energy than the oil or the OBC. Bounded by no particular theory, it is believed the surface-active agent in the present composition reduces oil bleed by reducing the surface energy of the polymer surface, thereby reducing propensity of the oil to collect on the polymer surface. Provision of sufficient surface-active agent yields a low energy surface to the entire polymer surface, achieving the desired effect of reduced, or no, oil bleed.

A. Fluorosurfactant

In an embodiment, the surface-active agent is a fluorosurfactant. A "fluorosurfactant," as used herein is a hydrocarbon chain with at least one hydrogen atom replaced by a fluorine atom, with the carbon chain also containing at least one functional group. Functional groups include hydroxyl, carboxyl, and carbonyl groups. In an embodiment, the surface-active agent is a perfluorosurfactant. A "perfluorosurfactant," as used herein, is a hydrocarbon chain with all the hydrogen atoms replaced by fluorine atoms, with the carbon chain also containing at least one functional group.

In an embodiment, the carbon chain of the fluorosurfactant or the perfluorosurfactant is a $C_4$-$C_{10}$ carbon chain.

In an embodiment, the surface-active agent is a perfluorosurfactant and has one, some, or all of the following properties:
a specific gravity from 1.2 to 1.5;
a weight-average molecular weight from 500 g/mol to 1500 g/mol; and
a surface tension (deionized water at 25° C.) less than 30 dyne (dyn)/cm at 0.01% concentration surfactant in water.

In an embodiment, the perfluorosurfactant is an ethoxylated nonionic perfluorosurfactant, in which the perfluorocarbon chains are $C_4$-$C_6$ carbon chains. The ethoxylated nonionic perfluorosurfactant does not produce, decompose, or otherwise degrade to perfluorooctanoic acid. The weight-average molecular weight of the ethoxylated nonionic perfluorosurfactant is from 700 g/mol to 1100 g/mol. The ethoxylated nonionic perfluorosurfactant has a specific gravity from 1.3 to 1.4, and a surface tension (deionized water at 25° C.) less than 25 dyn/cm at 0.01% surfactant in water concentration. A nonlimiting example of a suitable ethoxylated nonionic perfluorosurfactant is sold under the trade name CAPSTONE FS3100, available from E. I. du Pont de Nemours and Company.

In an embodiment, the composition includes from 0.01 wt %, or 0.1 wt %, or 0.5 wt %, or 1.0 wt % to 1.5 wt %, or 2.0 wt % of the (fluorosurfactant or perfluorosurfactant), based on the total weight of the oil-extended OBC composition.

B. Polysiloxane Surfactant

In an embodiment, the surface-active agent is a polysiloxane surfactant. A "polysiloxane surfactant" as used herein, is a polysiloxane chain, with the polysiloxane chain also containing at least one functional group. Functional groups include, hydroxyl, carboxyl, ether, and carbonyl groups. The polysiloxane surfactant has one, some, or all of the following properties:
a specific gravity from 0.9 to 1.1; and
a viscosity from 20 to 2500 centistoke at 25° C.

In an embodiment, the polysiloxane surfactant is a poly (ethylene glycol-b-dimethyl siloxane) copolymer. In a further embodiment, the poly(ethylene glycol-b-dimethyl siloxane) copolymer has a specific gravity from 1.0 to 1.1 and a viscosity from 150 to 400 centistoke at 25° C. A nonlimiting example of a suitable polysiloxane surfactant is DC-57 available from Dow Corning.

In an embodiment, the polysiloxane surfactant is a component of a pre-mixture. The pre-mixture includes the polysiloxane surfactant and an alkylene glycol, such as ethylene glycol.

In a further embodiment, the polysiloxane surfactant is halogen-free. That is, the polysiloxane surfactant (or the aforementioned pre-mixture containing same) is void of fluorine, chlorine, bromine and iodine.

In an embodiment, the oil-extended OBC composition includes from 0.01 wt %, or 0.1 wt %, or 0.5 wt %, or 1.0 wt % to 1.5 wt %, or 2.0 wt % of the polysiloxane surfactant, based on the total weight of the composition.

In an embodiment, the oil-extended OBC composition contains from about 30 wt % to about 70 wt % olefin block copolymer, from about 30 wt % to about 70 wt % oil, and from about 0.01 wt % to about 2.0 wt % surface-active agent.

In an embodiment, the oil extended OBC composition includes:
from 25 wt %, or 26 wt %, or 30 wt % to 33 wt %, or 35 wt %, or 39 wt %, or 40 wt %, or 45 wt % OBC;

from 35 wt %, or 40 wt %, or 45 wt % to 49 wt %, or 50 wt %, or 55 wt %, or 60 wt % oil; and from 0.01 wt %, or 0.1 wt %, or 0.013 wt %, or 0.016 wt %, or 1.0 wt % to 1.5 wt %, or 2.0 wt % surface-active agent.

In an embodiment, the oil-extended OBC composition has a Shore A hardness from 5, or 10, or 20 to 30, or 35, or 40, or 50.

In an embodiment, the oil-extended OBC composition contains a filler. Nonlimiting examples of suitable filler include talc, calcium carbonate, chalk, calcium sulfate, clay, kaolin, glass, mica, wollastonite, feldspar, aluminum silicate, silica, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, and titanates.

In an embodiment, the oil-extended OBC composition is phthalate-free.

Applicants have surprisingly discovered that provision of a surface-active agent unexpectedly reduces oil-bleed while maintaining softness in oil-extended OBC compositions. The term "oil-bleed-out" or "oil-bleed" is the phenomenon whereby oil migrates from the interior of a polymeric component to the surface of the polymeric component. Oil-bleed makes the surface sticky and/or slippery. Oil-bleed typically results in adverse "feel" (haptics) and/or adverse "optics" (visual appearance). The term "oil exudation" is the process of oil moving from an interior location to a surface of a polymeric component. Oil exudation yields oil-bleed. In other words, oil-bleed is the end result of oil exudation. Oil-bleed is accelerated by elevated temperatures.

Oil-bleed is evaluated by way of a normalized oil-bleed index (NOBI). NOBI is an optical measurement of the amount of oil absorbed on cigarette paper from an oil-containing polymeric composition. NOBI is calculated according to the following equation:

Normalized Oil-bleed Index=100·(% grey scale sample−% grey scale control)/(100−% grey scale control)

The term "% grey scale sample" is the percent grey scale measured on the aged sample and "% grey scale control" is a measurement on an unaged untreated sheet of cigarette paper. The term "% grey scale" is equal to the percentage of black pixels on a binary (black and white) digital image of the cigarette paper. The image can be obtained for example by digital scanning or digitally photographing a sheet of cigarette paper. NOBI has a range from 0-100. When NOBI=100, the paper is saturated and the test does not register oil-bleed beyond that level. When NOBI=0, the paper has no oil markings and its appearance is similar to that of untreated cigarette paper. Normal experimental error may result in a higher value of NOBI for a control sample (untreated sheet of cigarette paper) than for a treated sample with low oil absorption, thus creating negative values of NOBI.

Figure 1:
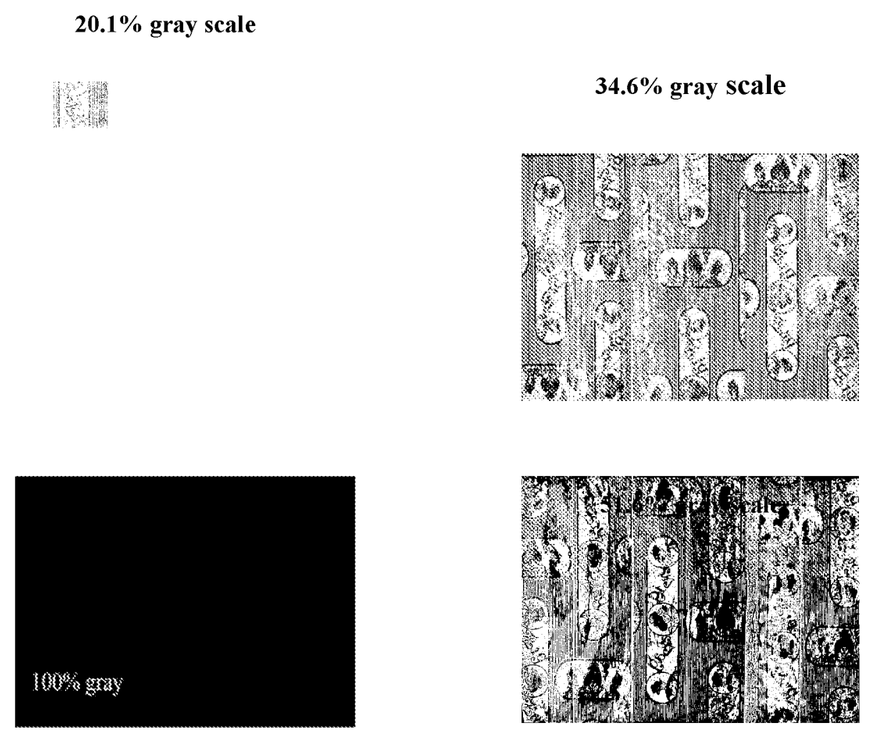
FIG. 1 shows examples of various grey scales used for the normalized oil-bleed index in accordance with an embodiment of the present disclosure.

FIG. 1 shows four degrees of grey scale with conversion to a corresponding NOBI index (using the NOBI equation above) as set forth in Table 1 below.

TABLE 1

| % Grey Scale (FIG. 1) | NOBI Index |
| --- | --- |
| 20.1% | 0 |
| 34.6% | 18.1 |
| 51.6% | 39.4 |
| 100% | 100 |

In an embodiment, the oil-extended OBC composition has a NOBI index of less than 30, or from 0, or 1, or 2, or 5 to less than 30, or less than 20, or less than 15, or less than 10 after 24 hours at 23° C.

In an embodiment, the oil-extended OBC composition has a NOBI index of less than 30, or from 0, or 1, or 2, or 5 to less than 30, or less than 20, or less than 15, or less than 10 after 1 week at 23° C.

In an embodiment, the oil-extended OBC composition has a NOBI index of less than 30, or from 0, or 1, or 2, or 5 to less than 30, or less than 20, or less than 15, or less than 10 after 3 weeks at 23° C.

In an embodiment, the oil-extended OBC composition has a NOBI index after 3 weeks at 23° C. from 0, or 1, or 5 to 12, or 15, or less than 20.

In an embodiment, the oil-extended OBC composition has a Shore A hardness from 5, or 10 to 50, or 30, or 25, or 20.

The disclosure provides another composition. In an embodiment, an oil-extended polymeric composition is provided and includes an olefin block copolymer, from 70 phr to 250 phr oil, and from 0.05 phr to 5 phr surface-active agent. The composition has a Shore A hardness from 5 to 50. The composition also has a normalized oil-bleed index of less than or equal to 30, or less than or equal to 20 after three weeks at 23° C.

The term "phr" or "parts per hundred," as used herein, is based on a composition having 100 phr OBC. In other words, the composition contains 100 phr OBC. The term "phr" provides a way to identify the unique relationship between the OBC, the oil, and the surface-active agent regardless of other optional components that may be present in the composition.

In an embodiment, the oil-extended OBC composition includes from 150 phr to 235 phr oil.

In an embodiment, the oil-extended OBC composition contains from 0.5 phr to 5 phr surface-active agent.

In an embodiment, the oil-extended OBC composition has a NOBI index of less than 30, or from 0, or 1, or 2, or 5 to less than 30, or less than 20, or less than 15, or less than 10 after 24 hours (1 day) at 23° C.

In an embodiment, the oil-extended OBC composition has a NOBI index of less than 30, or from 1, or 2, or 5 to less than 30, or less than 20, or less than 15, or less than 10 after 1 week at 23° C.

In an embodiment, the oil-extended OBC composition has a NOBI index of less than 30, or from 0, or 1, or 2, or 5, to less than 30, or less than 20, less than 15, or less than 10 after 3 weeks at 23° C.

In an embodiment, the oil-extended OBC composition has a NOBI index after 3 weeks at 23° C. from 0, or 1, or 5 to 12, or 15, or less than 20.

In an embodiment, the oil-extended OBC composition has a Shore A hardness from 5, or 10 to 50, or 40, or 30, or 25, or 20.

The disclosure provides another composition. In an embodiment, an oil-extended olefin block copolymer composition is provided and includes an olefin block copolymer (OBC), an olefin-based polymer, an oil, and a surface-active agent. The OBC and the surface active agent can be any respective OBC and surface active agent as previously described herein.

4. Olefin-based Polymer

The oil-extended OBC composition includes an olefin-based polymer. The olefin-based polymer is different than the olefin block copolymer. The term, "olefin-based polymer," as used herein, refers to a polymer that comprises, in polymerized form, a majority amount of olefin monomer, for example ethylene or propylene (based on the weight of the polymer), and optionally may comprise one or more comonomers.

In an embodiment, the olefin-based polymer is a propylene-based polymer. The term, "propylene-based polymer," as used herein, refers to a polymer that comprises, in polymerized form, a majority amount of propylene monomer (based on the weight of the polymer), and optionally may comprise one or more comonomers. The propylene-based polymer may be (i) a Ziegler-Natta catalyzed propylene copolymer comprising repeating units derived from propylene and one or more α-olefins having from 2 (ethylene is considered an α-olefin for purposes of this disclosure) or from 4 to 10 carbon atoms; (ii) a metallocene-catalyzed propylene copolymer comprising repeating units derived from propylene and one or more α-olefins having 2 or from 4 to 10 carbon atoms; (iii) a Ziegler-Natta-catalyzed propylene homopolymer; (iv) a metallocene-catalyzed propylene homopolymer; and combinations thereof.

In an embodiment, the propylene-based polymer is a propylene homopolymer.

In an embodiment, the oil-extended OBC composition contains 10 wt % to 40 wt % OBC, 5 wt % to 25 wt % propylene homopolymer, 15 wt % to 60 wt % oil, and 0.01 wt % to 2.0 wt % surface-active agent. Weight percent is based on total weight of the oil-extended composition.

In an embodiment, the olefin-based polymer is an ethylene-based polymer. The term, "ethylene-based polymer," as used herein, refers to a polymer that comprises, in polymerized form, a majority amount of ethylene monomer (based on the weight of the polymer), and optionally may comprise one or more comonomers. The ethylene-based polymer may be (i) a Ziegler-Natta catalyzed ethylene copolymer comprising repeating units derived from ethylene and one or more α-olefins having from 3 to 10 carbon atoms; (ii) a metallocene-catalyzed ethylene copolymer comprising repeating units derived from ethylene and one or more α-olefins having from 3 to 10 carbon atoms; (iii) a Ziegler-Natta-catalyzed ethylene homopolymer; (iv) a metallocene-catalyzed ethylene homopolymer; and combinations thereof.

In an embodiment, the olefin-based polymer is an ethylene/α-olefin copolymer. The term "ethylene/α-olefin copolymer," as used herein, refers to a copolymer that comprises, in polymerized form, a majority amount of ethylene monomer (based on the weight of the copolymer), and an α-olefin, as the only two monomer types. The ethylene/α-olefin copolymer can include ethylene and one or more $C_3$-$C_{20}$ α-olefin comonomers. The comonomer(s) can be linear or branched. Nonlimiting examples of suitable comonomers include propylene, 1-butene, 1-pentene, 4-methyl-1-pentene, 1-hexene, and 1-octene. The ethylene/α-olefin copolymer can be prepared with either Ziegler-Natta, chromium-based, constrained geometry or metallocene catalysts in slurry reactors, gas phase reactors or solution reactors. The ethylene/α-olefin copolymer is a random copolymer and is distinct from the OBC which has a block intra-molecular architecture.

In an embodiment, the ethylene/α-olefin copolymer is a high density ethylene/α-olefin copolymer having a density range with a lower limit from 0.94 g/cc, or greater than 0.94 g/cc, or 0.95 g/cc to an upper limit of 0.96 g/cc, or 0.970 g/cc. In a further embodiment, the high density ethylene/α-olefin copolymer has a melt index from 0.5 g/10 min to 10.0 g/10 min.

In an embodiment, the oil-extended OBC composition has a NOBI index of less than 30, or from 0, or 1, or 2, or 5 to less than 30, or less than 20, or less than 15, or less than 10 after 24 hours at 23° C.

In an embodiment, the oil-extended OBC composition has a NOBI index of less than 30, or from 1, or 2, or 5 to less than 30, or less than 20, or less than 15, or less than 10 after 1 week at 23° C.

In an embodiment, the oil-extended OBC composition has a NOBI index of less than 30 or from 1, or 2, or 5 to less than 30, or less than 20, or less than 15, or less than 10 after 3 weeks at 23° C.

In an embodiment, the oil-extended OBC composition has a NOBI index after 3 weeks at 23° C. from 0, or 1, or 5 to 12, or 15, or less than 20.

Any of the foregoing oil-extended olefin block copolymer compositions may optionally include one or more of the following additives: slip agents, anti-blocking agents, plasticizers oils, antioxidants, UV stabilizers, colorants or pigments, fillers, lubricants, antifogging agents, flow aids, coupling agents, cross-linking agents, nucleating agents, solvents, flame retardants, antistatic agents, and any combination thereof. The total amount of the additive(s) can range from about greater than 0, or about 0.001%, or about 0.01%, or about 0.1%, or about 1%, or about 10% to about 80%, or about 70%, or about 60%, or about 50%, or about 40% of the total weight of the polymer blend.

In an embodiment, any of the foregoing oil-extended olefin block copolymer composition is free of silica or is otherwise void of silica.

In an embodiment, any of the foregoing oil-extended olefin block copolymer composition is free of wax or is otherwise void of wax.

Any of the foregoing oil-extended olefin block copolymer compositions may comprise two or more embodiments disclosed herein.

Any of the foregoing oil-extended olefin block copolymer compositions may be a component of one or more of the following articles: molded articles, extruded articles, overmolded grips, baby bibs, gaskets. The oil-extended OBC compositions disclosed herein can be used to manufacture durable articles for the automotive, construction, medical, food and beverage, electrical, appliance, business machine, and consumer markets. In some embodiments, the oil-extended OBC composition is used to manufacture flexible durable parts or articles selected from toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, footwear, shoe bladders and shoe soles. In other embodiments, the oil-extended OBC composition can be used to manufacture durable parts or articles that require a high tensile strength and low compression set. In further embodiments, the oil-extended OBC composition can be used to manufacture durable parts or articles that require a high upper service temperature and low modulus.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range.

The terms "blend" or "polymer blend," as used herein, is a blend of two or more components (or two or more polymers). Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Normalized oil-bleed index (NOBI) is an optical measurement of the amount of oil absorbed on cigarette paper from an oil-containing polymer composition. NOBI is a phenomenological measurement related not only to the rate of oil migration to the surface but also the rate of oil absorption by the paper and the translucence induced thereby. NOBI is not directly proportional to the mass of the oil on the surface.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

Test Methods $^{13}C$ NMR is performed on OBC polymer to determine weight percent hard segment/soft segment.

A. $^{13}C$ NMR Sample Preparation

The sample is prepared by adding approximately 2.7 g of stock solvent to 0.21 g sample in a 10mm NMR tube, and then purging in a $N_2$ box for 2 hours. The stock solvent is made by dissolving 4 g of PDCB in 39.2 g of ODCB with 0.025M chromium acetylacetonate (relaxation agent). The sample is dissolved and homogenized by heating the tube and its contents at 140-150° C.

B. Data Acquisition Parameters

The data are collected using a Bruker 400 MHz spectrometer equipped with a Bruker Dual DUL high-temperature CryoProbe. The data are acquired using 320 transients per data file, a 7.3 sec pulse repetition delay (6 sec delay+1.3 sec acq. time), 90 degree flip angles, and inverse gated decoupling with a sample temperature of 120° C. All measurements are made on non-spinning samples in locked mode. Samples are homogenized immediately prior to insertion into the heated (125° C.) NMR Sample changer, and are allowed to thermally equilibrate in the probe for 15 minutes prior to data acquisition.

Differential Scanning calorimetry (DSC)

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Gel Permeation Chromatography (GPC)

Conventional GPC measurements are used to determine the weight-average (Mw) and number-average (Mn) molecular weight of the polymer, and to determine the MWD (=Mw/Mn). Samples are analyzed with a high-temperature GPC instrument (Polymer Laboratories, Inc. model PL220).

The method employs the well-known universal calibration method, based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M\text{polyethylene}=a*(M\text{polystyrene})^b.$$

In this equation, a=0.4316 and b=1.0 (as described in Williams and Ward, *J. Polym. Sc., Polym. Let.*, 6, 621 (1968)). Polyethylene equivalent molecular weight calculations were performed using VISCOTEK TriSEC software Version 3.0.

Fingerprint testing was conducted on compression molded plaques. The appearance of fingerprints on the surface of the molded plaques was determined by applying even, firm pressure with the thumb for 5 s to a plaque after sitting at room temperature for 1 day and 7 days or after heat aging at 70° C. for 1 day and 7 days. For oven-aged samples, the fingerprint test was conducted immediately upon removal of the sample from the oven. The appearance of a fingerprint was evaluated using the following scale: 1=no visible fingerprint, 2=marginally visible fingerprint, and 3=clearly visible fingerprint.

Melt Index (MI) is measured in accordance with ASTM D 1238, Condition 190° C./2.16 kg. Melt flow rate (MFR) is measured in accordance with ASTM D 1238, Condition 230° C./2.16 kg.

Normalized oil-bleed index (NOBI) is an optical measurement to compare oil-bleed characteristics. Optical measurements are obtained according to the following procedure.

1. Test specimens in the form of approximately 3×6⅛× 0.125 inch specimens are cut from the compression molded plaques. Specimens are cut from areas with minimal bubbles/dimples.
2. Within 2 hours of compression molding, the specimens are overlaid with 3 pieces of ZigZag cigarette paper laid side-to-side, with the length direction of the paper aligned perpendicular to the length direction of the specimens. A sheet of Mylar film is placed on the other side of the paper, so that a sandwich is formed of Mylar film-paper-plaque.
3. The sandwich is placed in 40 or 60° C. ovens or at room temperature in the laboratory, Mylar film layer down. Samples are then aged for 24 hours, 1 week, and 2 weeks or 3 weeks. No mass is present on top of the sample plaques, i.e., the force on the paper is due to the mass of the plaque and gravity. The samples are either supported by a laboratory countertop, the base of the oven chamber, or a metal wire rack in the Thermo oven. No additional support surface is present on the wire racks so the force is concentrated on the wires of the rack, though the Mylar sheet distributes it somewhat. The wires are approximately ⅛ inch diameter and are spaced ¾ inch apart (center to center).
4. Following aging, one of the three papers is removed from the specimen and the specimen is returned to the oven until the third paper is removed at the end of the aging period. Paper removal is difficult in the case of samples with considerable oil bleed since the paper is prone to tearing; if necessary, the torn paper is pieced together as well as possible. The removed paper from a given specimen is adhered (using double-sided tape) to a standard approx. 9×12 inch sheet made from non-glossy black compound.
5. Papers are scanned and analyzed as described below. First a control sample is scanned (a new sheet of cigarette paper attached to a black plaque). Then, a paper sample from a plaque sandwich is removed from the sandwich, mounted on the black plaque as described above, and scanned. This is repeated for the other samples. All samples are scanned as quickly as possible, one after another, to minimize potential for scanner drift. Note that the same black plaque is used for all samples, so the mounting and analysis is done sequentially.
6. Scanning is performed using a Xerox WorkCentre M118i copier/fax/scanner. The image is scanned in "Text" mode at 200 dpi, and saved as a TIFF file.
7. Method A. The TIFF file is opened in Microsoft Paint, cropped on two sides, then saved. The image is then opened in Adobe Photoshop CS2 (v.9) and cropped on the other two sides. The "text mode" image is a bitonal image. The percentage of black pixels in the image was the desired result. This is conveniently obtained in this software by first converting it to an 8-bit greyscale image so that a greyscale histogram can be created, with just 2 levels of greyscale, 0 (black) to 255 (white). The percentile of the 0 greyscale level in the histogram is the same as the percentage of black pixels. (This value was called "% grey scale" but is actually a percentile and for the method as described is equal to the "% black pixels" in the bitonal image. The method works because Photoshop CS2 compresses large images by combining 4 pixels into 1 greyscale pixel when using Cache Level 2 thus creating 5 grey scale colors ranging from all white to all black; the grey scale percentile in the histogram is thus equivalent to the percent black pixels in the bitonal image). Method B. As an alternative to and more direct method than Method A, a bitonal image is opened with ImageJ software (v. 1.41) (National Institutes of Health) and the region of cigarette paper selected using the select tool. Using the Analyze\Set Measurement menu, "Area Fraction" is selected as a desired output. Then, using the Analyze\Measure menu, the % Area is reported for the selected image area. This % Area is the % black pixels in the selected area.
8. This "% grey scale" (equal to % black pixels) is recorded along with the images in an Excel spreadsheet for both the control sheet as well as the paper sheets in contact with a polymer specimen.

Molded plaques are aged for 24 hrs, 1 week and 2 weeks or 3 weeks (at 23° C. and 60° C.) while resting on sheets of ZigZag cigarette paper. After aging, the cigarette paper is removed and optically scanned against a black background to measure the extent of oil-bleed. A normalized oil-bleed index (NOBI) is calculated according to the following equation:

$$\text{Normalized Oil-bleed Index} = 100 \cdot (\% \text{ grey scale sample} - \% \text{ grey scale control})/(100 - \% \text{ grey scale control})$$

The term "% grey scale sample" is the percentile grey scale (% black pixels) measured on the aged sample and "% grey scale control" is a measurement on an unaged untreated sheet of cigarette paper. NOBI has a range from 0 to 100. When NOBI=100, the paper is saturated and the test does not register oil-bleed beyond that level. FIG. 1 shows four examples of grey scale: 20.1%, 34.6%, 51.6%, and 100% grey scale. If the first example (20.1%) is used as the control for normalization, then corresponding NOBI values for these four images are 0%, 18.1%, 39.4% and 100%.

Shore A hardness is measured on molded plaques in accordance with ASTM D 2240. This test method permits hardness measurements based on either initial indentation or indentation after a specified period of time, or both. In the examples, a specified time of 10 seconds is used.

By way of example and not by limitation, examples of the present disclosure will now be provided.

EXAMPLES

The properties of the materials used in Example 1 are provided in Table 2 below.

TABLE 2

| Ingredient | Component | Specifications | Source |
|---|---|---|---|
| INFUSE ™ 9007 | OBC - ethylene/octene block copolymer | 0.5 MI, 0.866 g/cc density | The Dow Chemical Company |
| INFUSE ™ 9010 | OBC - ethylene/octene block copolymer | 0.5 MI, 0.877 g/cc density | The Dow Chemical Company |
| Hydrobrite ™ 550 | Oil | mineral oil with nominal 70% paraffinic and 30% naphthenic content, and average molecular weight of 541 g/mol | Sonneborn |
| H7012-35RN | PP | 35 MFR propylene homopolymer | Braskem |
| 5E16S | PP | 35 MFR propylene homopolymer (anti-stat grade) | Braskem |
| Zonyl FSN-100 | surface-active agent | Approximately 950 molecular weight ethoxylated nonionic fluorosurfactant at 100% concentration. Based on fluorinated C4-C10 alkyl mixture. | DuPont |
| Zonyl FSO-100 | surface-active agent | Approximately 725 molecular weight ethoxylated nonionic fluorosurfactant at 100% concentration. Based on fluorinated C4-C10 alkyl mixture. | DuPont |
| Capstone FS-3100 | surface-active agent | Nonionic fluorosurfactant at 100% concentration. | DuPont |
| DC 57 Additive | surface-active agent | 70-90 wt % dimethyl, methyl (polyethylene oxide acetate-capped) polysiloxane; 10-30 wt % polyethylene glycol monoallyl ether acetate; <3 wt % polyethylene glycol diacetate | Dow Corning |

PP = propylene-based polymer

Samples are prepared as follows:

Oil is imbibed into OBC polymer at 50-60° C. overnight, at a minimum. Compounding is accomplished using a HAAKE torque rheometer with a 190° C. Rheomix 3000E mixing bowl and roller blades at nominal mixing speed of 60 rpm for a period of 5-6 minutes after all of the formulation components were added to the mixing bowl.

Compression molding is done at 190° C. using an approximately 125 mil thick chase, using the following program:
2 minutes at 3000 psi
2 minutes at 5000 psi
5 minutes at 40,000 psi
Cool for 5 minutes at 40,000 psi Samples are tested for hardness and oil bleed as previously described.

Molded plaques are aged (24 hrs, 1 week and 3 weeks at 23° C. and 60° C.) while resting on sheets of ZigZag cigarette paper. After aging, the cigarette paper is removed and optically scanned against a black background to measure the extent of oil-bleed. The normalized oil-bleed index (NOBI) is calculated.

The hardness of each sample is measured. The results are shown in Table 3 below.

TABLE 3

| Component/PHR | Comp. A | Inv. 1 | Comp. B | Inv. 2 | Inv. 3 | Inv. 4 | Inv. 5 | Comp. C | Inv. 6 | Comp. D | Inv. 7 | Inv. 8 | Comp. E | Inv. 9 |
|---|---|---|---|---|---|---|---|---|---|---|---|---|---|---|
| INFUSE ™ 9007 | 100 | 100 | 100 | 100 | 100 | 100 | 100 | 100 | 100 | | | | | |
| INFUSE ™ 9010 | | | | | | | | | | 100 | 100 | 100 | 100 | 100 |
| PP H7012-35RN | | | 50 | | | 50 | 50 | 50 | 50 | | 50 | 50 | 50 | 50 |
| PP 5E 16S | | | | 50 | 50 | | | | | | | | | |
| Hydrobrite 550 | 150 | 150 | 150 | 150 | 150 | 150 | 150 | 233 | 233 | 150 | 150 | 150 | 233 | 233 |
| Zonyl FSN100 | | 5 | | 5 | | | 0.5 | | | | | | | |
| Zonyl FSO100 | | | | | 5 | | | | | | | | | |
| Capstone FS3100 | | | | | | | | | 0.5 | | 0.5 | | | 0.5 |
| DC 57 | | | | | | 0.5 | | | | | | 0.5 | | |
| TOTAL PHR | 250 | 255 | 300 | 305 | 305 | 300.5 | 300.5 | 383 | 383.5 | 300 | 300.5 | 300.5 | 383 | 383.5 |
| NOBI 1 day, 23° C. | 41 | 9 | 10 | 0 | 0 | 2 | 0 | 76 | 11 | 0 | 2 | 13 | 18 | 0 |
| NOBI 1 day, 60° C. | 88 | 34 | 13 | 0 | 0 | 13 | 0 | 100 | 33 | 4 | 7 | 17 | 41 | 8 |
| NOBI 1 week, 23° C. | 71 | 4 | 13 | 0 | 0 | 1 | 4 | 94 | 12 | 3 | 3 | 7 | 63 | 3 |
| NOBI 1 week, 60° C. | 99 | 76 | 38 | 1 | 7 | 5 | 11 | 100 | 68 | 17 | 8 | 5 | 98 | 0 |
| NOBI 3 weeks, 23° C. | 93 | 15 | 23 | 3 | 0 | 6 | 7 | 99 | 19 | 15 | 0 | 0 | 97 | 1 |
| NOBI 3 weeks, 60° C. | 100 | 95 | 58 | 10 | 16 | 13 | 38 | 100 | 96 | 18 | 4 | 3 | 100 | 30 |
| Fingerprint 3 weeks, 23° C. | — | — | 3 | — | — | 1 | 1 | — | — | — | — | — | — | — |
| Fingerprint 2 weeks, 60° C. | — | — | 3 | — | — | 1 | 3 | — | — | — | — | — | — | — |
| Shore A Hardness | 5 | 5 | 17 | 12 | 12 | 17 | 17 | 7 | 8 | 45 | 45 | 47 | 27 | 28 |

PHR = parts per hundred

Results

Inventive Example 1 shows that addition of 5 phr (1.96 wt %) of fluorosurfactant (Zonyl FSN-100) reduces oil bleed significantly after 24 hours, with NOBI of 9 and 34 at 23° C. and 60° C., respectively. Oil bleed is also reduced at 1 week and 3 weeks at 23° C., but bleed-out remains high after 1 and 3 weeks at 60° C.

Comparative Sample B shows that inclusion of propylene homopolymer in the formulation results in reduced oil bleed, with NOBI of 23 and 58 after 3 weeks at 23° C. and 60° C., respectively. Addition of propylene homopolymer reduces oil bleed but adversely affects the softness of the compound (makes it harder). Thus, it is desirable to use only a moderate amount of propylene homopolymer such as in this comparative sample, and then enhance the oil bleed resistance by other means. Formulations of 100 parts INFUSE™ 9007, 150 parts oil, and 50 parts propylene homopolymer exhibit about 15 Shore A hardness.

Inventive Examples 2-4 show that 5 phr (1.64 wt %) of fluorosurfactant (Zonyl FSN-100 or FSO-100) reduce oil bleed significantly as compared to Comparative Sample B. Inventive Example 4 shows that 0.5 phr (0.17 wt %) Zonyl FSN-100 achieves a similar reduction in oil bleed. While not wishing to be bound by any particular theory, it is believed that fluorosurfactant reduces oil bleed by reducing surface energy of the polymer surface, thereby reducing propensity of oil to collect there. Provided sufficient surfactant is present to provide a low energy surface to the entire polymer surface, the desired effect is achieved and additional surfactant does not increase the oil bleed resistance further.

Inventive Example 5 shows that a polysiloxane surfactant is also an effective surface-active agent for reducing oil bleed as compared to Comparative Sample B. Furthermore, Inventive Example 8 shows that the same polysiloxane surfactant is also effective at reducing oil bleed in a formulation with a different OBC and at a significantly higher hardness. Relative to Comparative Sample D, Inventive Example 8 has similar hardness, about 45 Shore A, but significantly lower oil bleed after 1 and 3 weeks at 23 and 60° C.

Comparative Sample C and Inventive Example 6 have higher oil content, 233 phr oil. Inventive Example 6, which contains 0.5 phr Capstone FS3100 fluorosurfactant, has significantly lower oil bleed than Comparative Sample C, which does not contain a surfactant. The NOBI is low after 1 day, 1 week, and 3 weeks at room temperature for Inventive Example 6, but there is oil bleed-out after aging at 60° C. for 1 week and 3 weeks.

Comparative Sample D has a similar composition in terms of oil and polypropylene content as Comparative Sample B, but contains a different OBC than Comparative Samples B. The use of INFUSE™ 9010 rather than INFUSE™ 9007 results in lower oil bleed values and significantly higher hardness, 45 Shore A for Comparative Sample D compared to 17 Shore A for Comparative Sample B. Similar to the other inventive examples, Inventive Example 7, which contains a fluorosurfactant, and Inventive Example 8, which contains a polysiloxane surfactant, both have significantly lower oil bleed than Comparative Sample D.

Comparative Sample E shows that oil bleed increases significantly when higher oil loading levels are used. Comparative Sample E contains 233 phr oil versus Comparative Sample D, which contains 150 phr oil. The oil bleed can be reduced even at this higher oil loading level by including a surfactant in the formulation. Inventive Example 9 contains 233 phr oil and 0.5 phr of a fluorosurfactant and has low oil bleed at 23 and 60° C. after 1 day, 1 week, and 3 weeks of aging.

In addition to reduced oil bleed, the inventive examples also have reduced stickiness as indicated by fingerprint testing. As described in the methods section, the fingerprint test is a qualitative measurement of the visibility of a thumbprint on the surface of a molded plaque following aging at a set temperature and time. A fingerprint rating of 1 indicates no visible fingerprints, which correlates to a non-sticky surface. A fingerprint rating of 3 indicates a clearly visible fingerprint, which correlates to a sticky surface. Inventive Examples 4 and 5 show significantly reduced stickiness as measured by the fingerprint test as compared to Comparative Sample B. Inventive Example 4 has reduced stickiness after aging at both 23 and 60° C., while Inventive Example 5 only has reduced stickiness after aging at 23° C.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. An oil-extended olefin block copolymer composition comprising:
    an olefin block copolymer that is an ethylene/α-olefin multi-block copolymer consisting of ethylene and a $C_3$-$C_{20}$ α-olefin;
    an oil; and
    a surface-active agent that is a fluorosurfactant,
    wherein the composition is free of silica.

2. The composition of claim 1 wherein the olefin block copolymer has a density from 0.85 g/cc to 0.88 g/cc.

3. The composition of claim 1 comprising from about 30 wt % to 70 wt % olefin block copolymer, from 30 wt % to 70 wt % oil, and from 0.01 wt % to 2.0 wt % surface-active agent.

4. The composition of claim 1 having a Shore A hardness from 5 to 50.

5. The composition of claim 1 having a normalized oil-bleed index of less than 30 after 1 week at 23° C.

6. The composition of claim 1 having a normalized oil-bleed index (NOBI) of less than 30 after 3 weeks at 23° C.

7. An oil-extended olefin block copolymer composition comprising:
    an olefin block copolymer that is an ethylene/α-olefin multi-block copolymer consisting of ethylene and a $C_3$-$C_{20}$ α-olefin;
    from 70 phr to 250 phr of an oil;
    from 0.05 phr to 5 phr of a surface-active agent that is a fluorosurfactant; and
    the composition has a Shore A hardness from 5 to 50 and a normalized oil-bleed index of less than or equal to 30 after three weeks at 23° C., and the composition is free of silica.

8. The composition of claim 7 comprising 150 phr oil.

9. The composition of claim 7 comprising from 0.5 phr to 5 phr surface-active agent.

10. An oil-extended olefin block copolymer composition comprising:
    an olefin block copolymer that is an ethylene/α-olefin multi-block copolymer consisting of ethylene and a $C_3$-$C_{20}$ α-olefin;
    an olefin-based polymer;
    an oil; and
    a surface-active agent that is a fluorosurfactant,
    wherein the composition is free of silica.

11. The composition of claim 10 wherein the olefin-based polymer is a propylene homopolymer.

12. The composition of claim 10 comprising from 10 wt % to 40 wt % olefin block copolymer;
    from 5 wt % to 25 wt % propylene homopolymer;
    from 15 wt % to 60 wt % oil; and
    from 0.01 wt % to 2.0 wt % surface-active agent.

13. The composition of claim 10 wherein the olefin-based polymer is a high density ethylene-based polymer.

* * * * *